United States Patent [19]

Clarke

[11] 4,126,941
[45] Nov. 28, 1978

[54] OUTLET BOX LOCATOR

[76] Inventor: J. Evan Clarke, P.O. Box 291, Thorneville, Ohio 43076

[21] Appl. No.: 811,526

[22] Filed: Jun. 30, 1977

[51] Int. Cl.² ............................................. G01B 5/14
[52] U.S. Cl. ............................ 33/180 R; 33/DIG. 10
[58] Field of Search .............. 269/321 S; 33/DIG. 10, 33/180 R, 174 G

[56] References Cited

U.S. PATENT DOCUMENTS

| 2,919,913 | 1/1960 | Phair | 33/180 R |
| 3,169,320 | 2/1965 | Currie | 33/174 G |
| 3,436,070 | 4/1969 | Utley et al. | 33/DIG. 10 |
| 3,751,026 | 8/1973 | Stickney | 269/321 S |

Primary Examiner—Richard E. Aegerter
Assistant Examiner—John W. Shepperd
Attorney, Agent, or Firm—Anthony D. Cennamo

[57] ABSTRACT

A template for positioning electrical outlet and switch boxes for attachment to a stud in a new construction. An elongated flat plate has a series of vertical notches formed therein on either side, one of each representing the standard height for a wall outlet box, utility outlet box, thermostat, and switch box. The template includes guide means to straddle the conventional 2 × 4 stud. Vertically positioned across the lower and upper portion of each notch is a cross plate secured thereto a distance adjustable to ⅛ inch, ⅜ inch, ½ inch, or ⅝ inch to act as a horizontal depth finder for securing the box.

5 Claims, 4 Drawing Figures

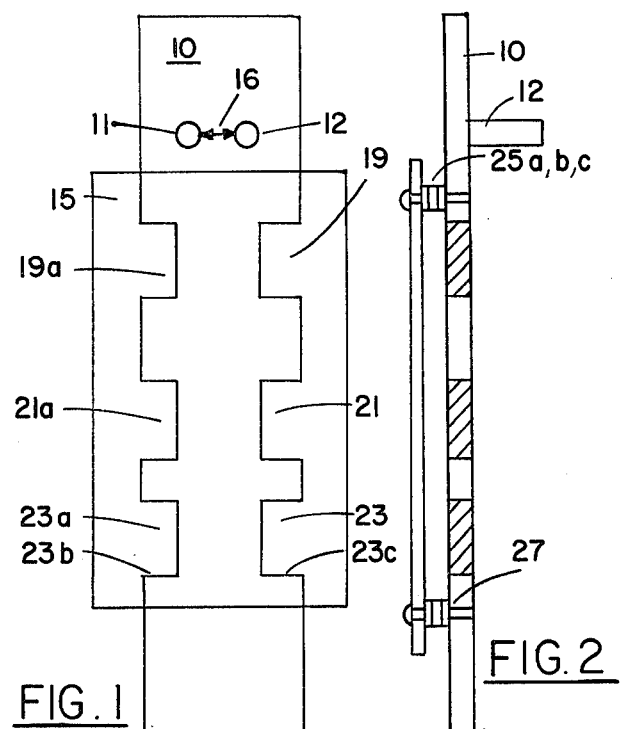
FIG. 1
FIG. 2
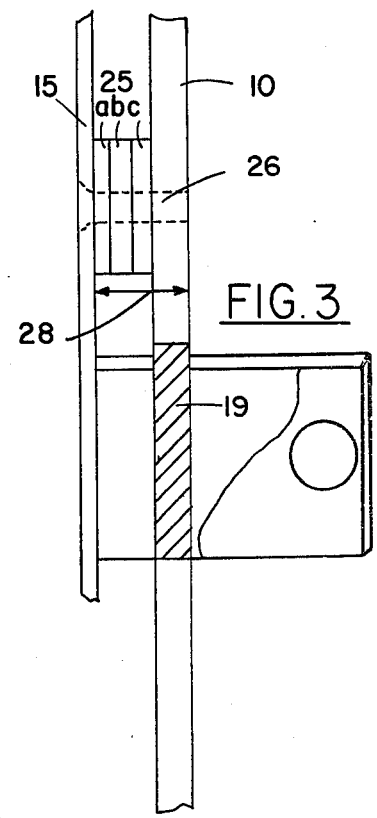
FIG. 3
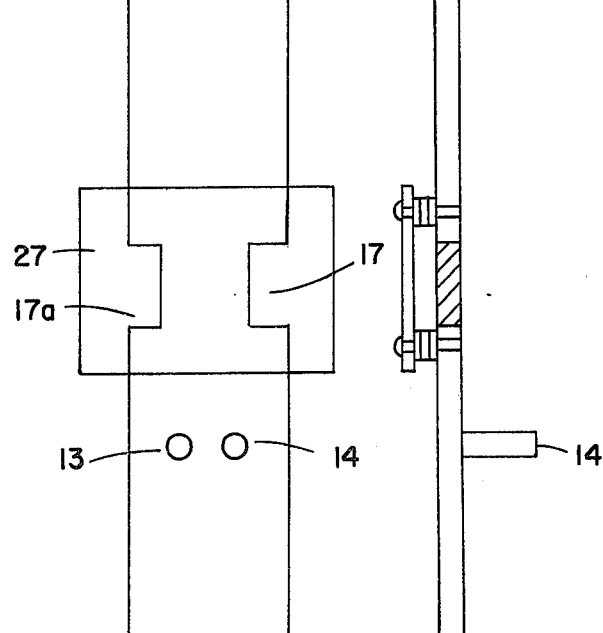
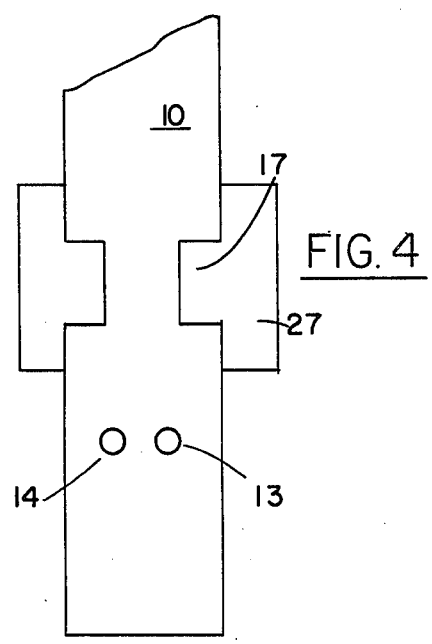
FIG. 4

OUTLET BOX LOCATOR

BACKGROUND

In the construction of homes after the framing, the carpenters secure to the upright studs the electrical outlet and switch boxes to assist the electricians in wiring. In most localities either by code or some other regulations, the boxes must be given vertical height and certain minimum distances apart. Also the switch boxes are controlled in height. Similarly, the new homes in almost every instance, includes a utility outlet box in the kitchen and certain special switches. Again, over 90 percent of the new residences are of a drywall construction; and, depending on the quality of the home, the drywall may be ⅜, ½ or ⅝ inches thick.

In horizontally positioning the electrical boxes adjacent the studs the thickness of the drywall must be considered.

PRIOR ART

The prior art has a dozen or so issued patents mostly found in Digest 10 of Class 33. These patented devices purport to provide the intended result; and, although somewhat cumbersome and bothersome, in most instances they are an aid. The primary difficulty with the prior art is that the devices are limited to a single outlet box and are lost in adjustability. In any given new residence the height of each outlet box, switch plate box, utility box, etc. will be known as well as the thickness of the drywall and the thickness of the stud. With the exceptions of the custom built homes, these dimensions are standardized for any given community and almost nationally. Furthermore, most new homes today are not of a single construction, but comprise developments, tracts, apartments, condominiums, or other joined residences. Accordingly, the need for adjustability is almost nill—2 but, the need for determining the location for each box without individual adjustment is greater.

SUMMARY OF INVENTION

The present invention is a template for electrical outlet and switch boxes that overcomes the above-noted attendant disadvantages of the prior art. The template contemplates the above noted standardization by having fixed heights for said boxes and a single adjustment for the thickness of the drywall. The template, therefore, is usable for an entire house with only a single prior adjustment—and in a development or multiple dwelling no further adjustment. The template straddles the stud and has the several outlet heights fixed therein. A stop positioned across the height notch fixes the horizontal location of the box.

OBJECTS

It is a principal object of the present invention to provide a new and improved template for fixing the vertical and horizontal position of electrical boxes adjacent a stud.

Another object of the invention is to provide a template having no or as minimum adjustment, to thereby assist the carpenter rather than make its use bothersome.

Other objects and features of the present invention will become apparent from the following detailed description, when taken in conjunction with the following drawings in which:

BRIEF DESCRIPTION OF DRAWINGS

FIG. 1 is an elevational view of the overall preferred embodiment.

FIG. 2 is a side view of FIG. 1;

FIG. 3 is an exploded side view of a portion of FIG. 2; and

FIG. 4 is an exploded back view of a portion of FIG. 2.

DETAILED DESCRIPTION OF DRAWINGS

With particular reference to the drawings there is illustrated a preferred embodiment of the present invention as actually constructed. The elongated flat member 10 is the primary member comprising the template. This member 10 is preferably metal having sufficient thickness for rigidity and hard use—but not so thick as to add excess weight. The thickness will vary with the material used. The overall length must be sufficient to exceed the highest electrical box. The height of the overall length and the notches therein is taken from the sub-flooring of a new construction.

Positioned on member 10, at a first vertical height is notch 17 and thereafter, notches 19, 21 and 23 on a first side and complimentary notches 17a, 19a, 21a, and 23a on the alternate side. The height of the notch is determined from its bottom vertical position as shown by base of notches 23b, and 23c. The height of the notch itself is not critical, so long as it is sufficient to accomodate the longest standard outlet box.

Positioned at the uppermost and lowermost ends of the member 10 are a pair of guides 11 and 12, and 13 and 14. These guides, from an imaginary longitudinal center line of member 10, are spaced apart a distance 16 just sufficient to straddle a conventional 2 × 4 stud (in actuality 1 11/16 inch). The vertical position of the guides on the member 10 is not critical but should be convenient to provide positioning of the template in a normal use manner.

Covering each notch in the member 10 is a horizontal locator plate such as shown by plate 15 and 27. The plate 15 is shown as one but may comprise separate plates for each notch. With particular reference to the exploded side view of FIG. 3, it is seen the plate 15 is spaced away from the member 10 by spaces 25a, b, and c, in this illustration having each a thickness of ⅛ inch. The spacers 25 and plate 15 are secured to member 10 by countersunk threaded screw 26. As can be understood the distance 28 between the inside wall of plate 15 and the outside wall of member 10 represents the thickness of the drywall. This spacing is varied to correspond to varying thickness of drywall by adding or removing certain of the spacers 25. This is accomplished by removing screw 26.

Alternatively, if the template 10 per se is ⅛ inch thick and all of the spacers were removed, the electrical box would be spaced ⅛ inch away from the wall. This ⅛ inch is, of course, the thickness of paneling.

In operation of the template illustrated in the several figures, the member 10 is caused to straddle a 2 × 4 stud—the lowermost end resting on the floor. An electrical box is placed sideways with its bottom side resting on the lower end of the notch and then moved forward to abut the inside wall of the horizontal locator plate. The box is then secured to the stud. This very simple and quick procedure is followed for each electrical box.

Although only a certain exemplified embodiment is illustrated and described, modifications may be had thereto in accordance with the invention.

What is claimed is:

1. A template for vertically and horizontally positioning outlet boxes on studs of buildings under construction comprising:

an elongated flat plate member having a series of notches formed therein, said plate and said notches having a cross-direction in the order of that of a stud and an outlet box;

said notches having its lowermost ledge at a height corresponding one each to the height desired for the several outlet boxes to be installed on a stud and wherein its upper ledge is sufficient in height to accomodate an outlet box;

a pair of guides positioned at the upper and lower ends of said elongated member and wherein the spacing there between is slightly greater that a stud to which said outlet box is positioned; and means for removing said securing means from said spacers for addition thereto or subtraction therefrom to vary said spacing.

2. The template of claim 1 wherein said notches are formed on either side of said member.

3. The template of claim 1 wherein said spacers correspond in overall thickness to correspond to the drywall-/paneling to be used.

4. The template of claim 1 wherein said notches are formed on both sides of said flat plate member.

5. The template of claim 1 wherein said spacers comprise a second plate and a plurality of removable elements.

* * * * *